Jan. 14, 1958 R. J. COAR 2,819,587
VALVE ARRANGEMENT FOR AFTERBURNER IGNITER CONTROL
Filed Nov. 18, 1950 2 Sheets-Sheet 1

INVENTOR
RICHARD J. COAR
BY Jack N. McCarthy
AGENT

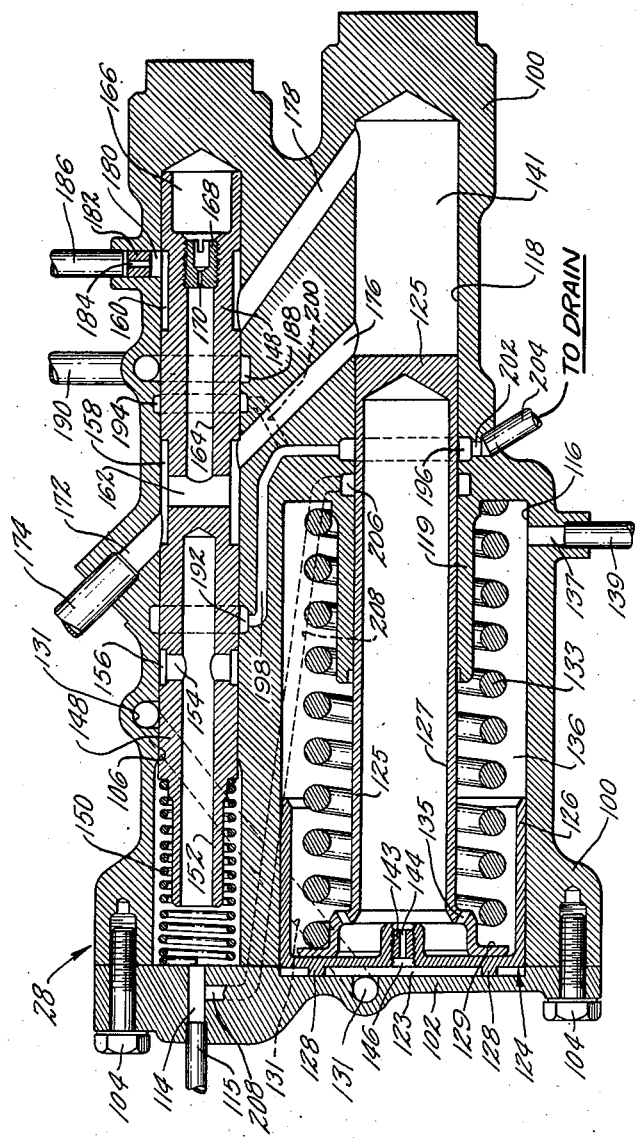

United States Patent Office 2,819,587
Patented Jan. 14, 1958

2,819,587

VALVE ARRANGEMENT FOR AFTERBURNER IGNITER CONTROL

Richard J. Coar, Hartford, Conn., assignor to United Aircraft Corporation, East Hartford, Conn., a corporation of Delaware Application November 18, 1950, Serial No. 196,426

9 Claims. (Cl. 60—35.6)

This invention relates to an igniter control, for use with a turbojet engine having an afterburner, for igniting said afterburner.

An object of this invention is to provide a fuel displacement igniter control which will ignite fuel entering the afterburner by momentarily enriching the mixture in a combustion chamber of the jet engine which results in the burning of said mixture beyond the turbine and into the afterburner.

Another object is to obtain an igniter control which will displace only a certain amount of fuel at any one time to be injected into a combustion chamber of the jet engine.

Further objects and advantages will be apparent from the following specification and drawing.

Fig. 2 is an enlarged view in section of the igniter control of the afterburner control system.

Figure 1:
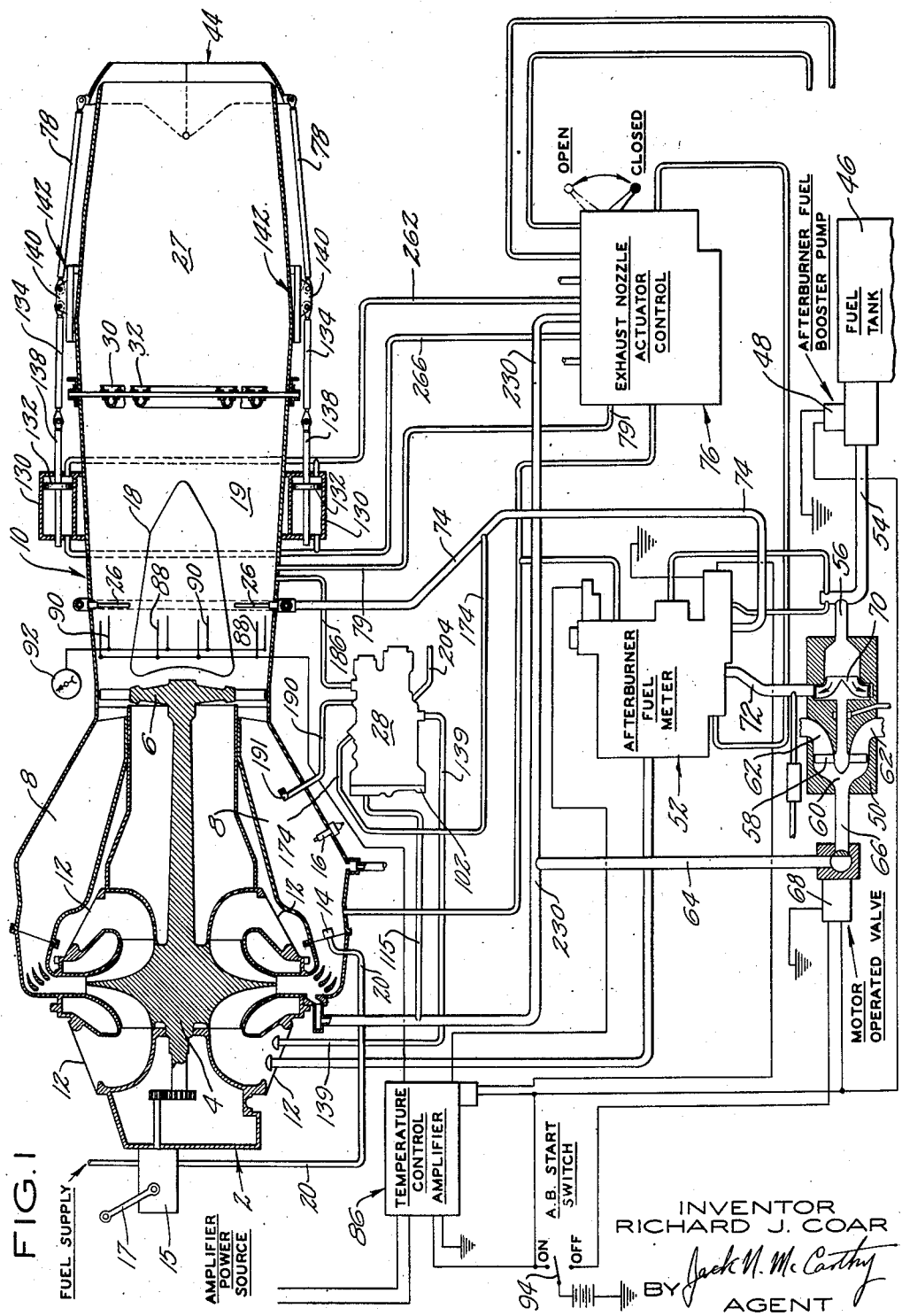
Fig. 1 is a schematic view of a turbojet engine including an afterburner showing the control system for said afterburner.

The turbojet engine 2 has a compressor 4, which, in the arrangement shown, is a centrifugal type, driven by a turbine 6. Combustion chambers 8 therebetween deliver air from the compressor to the turbine. An afterburner 10 is attached at the turbine outlet to provide a means of increasing the thrust.

The engine 2 has two axially-spaced annular intake openings 12 to direct the incoming air into the two oppositely facing annular compressor inlets. Compressed air discharging from the compressor 4 passes to the turbine through the combustion chambers 8 where it is mixed with fuel from fuel nozzles 14. These fuel nozzles 14 receive fuel from the governor 15 through conduit 20. The fuel-air mixture is initially ignited within the combustion chambers 8 by a spark igniter 16. The governor 15 maintains the rotative speed of the turbine rotor assembly in accordance with the value selected by the power lever 17 by controlling fuel flow supplied through conduit 20 and nozzles 14 to the combustion chambers 8.

From the turbine, the gases pass around a cone 18 into the diffuser section 19 of the afterburner. When the afterburner is operating, fuel is discharged into these gases from a plurality of fuel nozzles 26 located in the diffuser 19. Since the gases leaving the turbine 6 contain considerable unburned oxygen, the additional fuel introduced by fuel nozzles 26 provides a combustible mixture which may be initially ignited within combustion chamber 27 by ignition means hereinafter described. The burning of this combustible mixture is stabilized in the afterburner combustion chamber 27 by flameholders 30 and 32. The burned gases discharge from the engine through the variable area nozzle 44.

The variable area nozzle 44 operates between a minimum opening for engine operation without afterburning and a maximum opening for operation of the engine with afterburning. A nozzle and actuating system, similar to the one shown with this invention, is shown and claimed in co-pending application Serial No. 193,734, filed November 2, 1950, now Patent No. 2,714,285, issued August 2, 1955, to F. L. Geary. The actuating system consists of the cylinder 130, piston 132, connecting control rod 134, nozzle control rod 78, piston rod 138, a car 140, and a track mechanism 142 for said car.

The afterburner control system can be divided into three main parts, (1) the fuel system, (2) the ignition means and (3) the exhaust nozzle actuator control. These three parts are closely coordinated by fluid conduit connections and an electrical system.

The fuel system includes the fuel tank 46, the fuel booster pump 48, the fuel pump 50, the fuel meter 52 and the fuel nozzles 26. The fuel booster pump 48 is mounted on the fuel tank 46 and is connected to the fuel pump 50 by conduits 54 and 56. The fuel pump 50 shown is of the turbine driven type having a turbine rotor 58 mounted therein with an intake passage 60 and exhaust passages 62 for the working fluid. The working fluid, which is shown as compressed air supplied from the compressor outlet of the engine, is delivered to the intake passage 60 by conduits 230, 64 and 66. A motor operated valve 68 is located at the junction of conduits 64 and 66 to control the operation of the fuel pump by regulating the flow of compressed air to the pump. The turbine rotor 58 drives an impeller 70 which provides the pumping action. The fuel pump 50 delivers fuel to the fuel meter 52 through conduit 72. The fuel meter 52 meters the fuel therein and injects it into the engine through conduit 74 and nozzles 26. The fuel meter represented herein may be any one of many types some of which are shown and claimed in co-pending applications Serial No. 196,423, filed November 18, 1950, and Serial No. 196,414, filed November 18, 1950, now Patent No. 2,714,803, issued August 9, 1955, to R. N. Abild.

The exhaust nozzle actuator control 76 is a device to divert a pressure to the exhaust nozzle actuating cylinders 130 either to open or to close the exhaust nozzle as required. Compressed air from the compressor 4 is delivered to the nozzle control 76 by conduit 230 to provide the operating pressure. Conduit 262 connects the nozzle control to the side of the cylinders 130 nearest to the nozzle which causes the nozzle to open when the operating pressure is applied thereto and conduit 266 connects the nozzle control to the side of the cylinders 130 farthest from the nozzle which causes the nozzle 44 to close when the operating pressure is applied thereto. Turbine exhaust gas static pressure which is delivered to the control 76 by conduit 79 automatically controls this nozzle control 76 to connect conduit 230 to either conduit 262 or 266. An exhaust nozzle actuator control of this type is shown and claimed in co-pending application Serial No. 196,424, filed November 18, 1950, now Patent No. 2,715,311, issued August 16, 1955, to R. J. Coar.

The igniter control 28 injects an amount of fuel in addition to that normally supplied into a combustion chamber 8 where it is ignited resulting in flame propagation through the turbine into the afterburner for igniting a combustible mixture in the afterburner. Fuel is provided to the igniter control 28 from the afterburner fuel system by conduit 174.

Igniter control 28 has a housing 100 (see Fig. 2) with a cover 102 mounted on one end by bolts 104. A bore 106 is provided in said housing having its open end connected to passage 114 which connects to a conduit 115, which is shown as carrying compressor discharge pressure.

The housing 100 also has two bores 116 and 118 of different diameters which are coaxially aligned, one end of the smaller bore 118 extending into bore 116 through an inner cylindrical flange 119. The other end of bore 118 is closed by housing 100. Cover 102 closes the opening presented by bore 116.

A piston member 124 is mounted within bore 116 having a skirt 126 slidably engaging said bore. Projections 128 permit the end of piston member 124 to form a chamber 123 with cover 102 when piston 124 is in its extreme left position (see Fig. 2). A passage 131 connects chamber 123 to bore 106.

A piston member 125, with a bore 127 therein, has a slidable fit in bore 118 and extends out of inner cylindrical flange 119 into a chamber 136, which is formed by said flange 119, piston member 124, and bore 116. Chamber 136 is connected to reference pressure through opening 137 and conduit 139. A spring seat 129 is formed on the end of piston member 125 in chamber 136. A spring 133 is seated at one end around cylindrical flange 119 against the end of bore 116 and at its other end against spring seat 129. This spring biases piston members 124 and 125 to the left, piston member 125 against piston member 124 and the projections 128 of piston member 124 against cover 102, thereby forming a chamber 141 at the right end of bore 118 between housing 100 and the end of piston member 125. A bushing 143 having an orifice 144 is threaded into an opening 146 in piston member 124. This orifice connects chamber 123 with chamber 136 through holes 135 in piston 125.

A piston member 148 is slidably mounted in bore 106 and biased by a spring 150 to the right against the housing 100. A bore 152 extends into the left end of piston member 148 and is connected by passages 154 to an annular groove 156 around said piston member. This annular groove 156 is also connected to passage 131 when said piston member is positioned to the left in Fig. 2. A second annular groove 158, and a third annular groove 160, are formed around piston member 148. A passage 162 connects annular groove 158 to a passage 164 in piston member 148 which in turn is connected to a chamber 166 formed at the right end of piston 148 between said piston and housing 100. A bushing 168 with a restricting orifice 170 is mounted in passage 164.

A passage 172 in housing 100 connects annular groove 158 of piston member 148 with conduit 174, which delivers fuel from the afterburner fuel system, in any position of said piston member. A passage 176 in housing 100 connects annular groove 158 to chamber 141 when piston member 148 is in its spring biased position, to the right in Fig. 2 and piston 125 is in its spring biased position, to the left in Fig. 2. A pasage 178 in housing 100 connects chamber 141 to annular groove 160 on piston member 148 in any position of piston member 148 or piston member 125.

A passage 180 in housing 100 having a bushing 182 with a restricting orifice 184 therein connects annular groove 160 on piston member 148 with conduit 186 when piston member 148 is in its spring biased position, to the right in Fig. 2. Conduit 186 is a connection to drain; for convenience it is shown attached to the afterburner. An annular groove 188 in housing 100 around bore 106 is connected to a conduit 190 to direct fuel to a combustion chamber 8 through a nozzle 191; this groove 188 is connected to annular groove 160 of piston member 148 when said piston member is positioned to the left in Fig. 2.

Annular grooves 192 and 194 in housing 100 around bore 106, and annular groove 196 in housing 100 around bore 118 are so positioned to prevent leakage along said bores between different pressures of like fluids and between different fluids. These grooves are interconnected by passages 198 and 200. A passage 202 connects these grooves to conduit 204 which may go to drain. Annular groove 206 around piston 125 in bore 118 is connected by passage 208 to compressor discharge pressure conduit 115. Groove 206 then having a higher pressure than the drain pressure in groove 196 prevents flow from groove 196 into chamber 136.

The electrical system may include a temperature control amplifier 86 to which, during afterburner operation, is sent a signal by thermocouples 88 which sense turbine discharge temperature. Thermocouples 90 also sense turbine temperature but send their signal to temperature gage 92. This amplifier when energized sends a signal to the fuel meter 52 to attenuate fuel flow in accordance with turbine discharge temperature and controls the operation of a normally closed solenoid operated shut-off valve in the fuel meter 52. The afterburner switch 94 controls the amplifier 86, sets the motor operated valve 68 and controls the fuel booster pump 48.

*Operation*

Afterburner operation is initiated by placing switch 94 in its "ON" position. This movement energizes the temperature control amplifier 86 which in turn opens a normally closed solenoid operated shut-off valve in the fuel meter and sends a signal to the afterburner fuel meter 52 for attenuating fuel flow therethrough. This movement of the switch also places motor operated valve 68 in open position and starts the fuel booster pump 48.

The operation of the fuel booster pump forces fuel from the fuel tank 46 through conduits 54 and 56 to the impeller 70 of the fuel pump 50. The opening of the motor operated valve 68 allows compressed air to be directed from the outlet of the engine compressor 4 through conduits 230, 64 and 66 against turbine 58 to drive the impeller 70. The impeller 70 then delivers fuel to the afterburner fuel meter 52. This fuel meter 52 meters fuel under the influence of compressor pressure rise and the temperature control amplifier and this fuel passes by a normally closed solenoid shut-off valve, which is now open, through conduit 74 to the fuel nozzles 26.

The flow of fuel through conduit 74 is also directed to the igniter control 28 by conduit 174. It passes from conduit 174 through passage 172, annular groove 158 and passage 176 into chamber 141. It also passes from annular groove 158 through passage 162 to passage 164 and through restricting orifice 170 to chamber 166. From chamber 141 the fuel passes through passage 178 into annular groove 160. This groove is connected to drain by a passage 180, which has a restricting orifice 184, to permit chamber 141 to become purged of air so that it may be filled with fuel.

When chamber 141 has become filled, the fuel flowing into chamber 166 through orifice 170 beings to urge piston member 148 to the left against the spring 150. This action shuts off the supply of fuel to chamber 141, shuts off passage 180 from annular groove 160, ports compressor discharge pressure from conduit 115 to chamber 123 by way of bore 152, passages 154, annular groove 156 and passage 131, and connects conduit 190 to annular groove 160 through annular groove 188. Since chamber 136 is connected to compressor inlet pressure by conduit 139, the pressure differential across piston member 124 urges piston member 125 to the right. This action incidentally shuts off passage 176 from chamber 141 and displaces the fuel in chamber 141, forcing it through passage 178, annular grooves 160 and 188 and out conduit 190 to the nozzle 191. When piston 125 is at the left, the spring 133 is designed to be at its free length and exerts no force on the pistons 125 and 124. Therefore, the initial rate of injection is determined by the balance existing between the differential of fuel pressure in chamber 141 and the compressor inlet pressure in chamber 136 exerted across piston member 125 and the differential of compressor discharge pressure in chamber 123 and compressor inlet pressure in chamber 136 exerted across piston 124. Since the compressor rise increases as a function of the increase in engine air flow, this increase in pressure difference across piston member 124 must be balanced by increased pressure in chamber 141 which results in a higher rate of fuel flow through the nozzle 191. By this means, a degree of altitude compensation is effected so that the excess fuel/air ratio in the combustion chamber provided for ignition is kept essentially constant. The amount of fuel injected during each operation of the igniter is determined by the compressor rise and spring 133. Ignition of the injected fuel results in flame propagation through the turbine to the tail pipe resulting in ignition in the afterburner of the fuel being introduced through nozzles 26.

The ignition of fuel within the afterburner results in an increase in turbine exhaust gas pressure above that normally obtained without afterburning. This increase in pressure is transmitted to the exhaust nozzle actuator control through conduit 79. The control 76 in accordance with this pressure directs compressed discharge air from conduit 230 through conduit 262 to the side of the cylinders nearest the nozzle which causes the nozzle to open.

To stop the operation of the afterburner the afterburner switch 94 is turned to its "off" position. This turns the temperature control amplifier 86 off thereby turning off a supply of current to a normally closed solenoid operated shut-off valve in the fuel meter. The movement of the switch to the "off" position also closes the motor operated valve 68 and turns off the afterburner fuel booster pump 48. It will be seen that with no fuel flow combustion cannot be maintained in the afterburner. The decrease in afterburner pressure is transmitted to the exhaust nozzle actuator control by conduit 79 thereby directing compressor discharge air from conduit 230 through conduit 266 to the side of the cylinders farthest from the nozzle which causes the nozzle to close. The closing of the shut-off valve in the fuel meter in effect connects igniter control 28 to drain by conduit 174 through conduit 74 to nozzles 26. The spring 150 then moves piston member 148 to the right in Fig. 2 with the fuel in chamber 166 being forced through orifice 170 into passage 164. The movement of piston member 148 to the right shuts off the compressor discharge pressure from chamber 123 permitting spring 133 to move piston members 125 and 124 to the left, the gas in chamber 123 flowing through orifice 144 and holes 135 to chamber 136. This places the igniter control 28 in condition to be operated upon the next starting of the afterburner.

Although a specific igniter control has been shown and described herein for purpose of illustration, it will be evident to those skilled in the art that the invention is capable of various modifications and adaptations within the scope of the appended claims. The control system for an afterburner as shown in this application is shown and claimed in co-pending application Serial No. 196,425, filed November 18, 1950, now Patent No. 2,780,054, issued February 5, 1957, to Richard J. Coar et al., and an igniter control of the type shown in this application is shown and claimed in co-pending application Serial No. 196,402, filed November 18, 1950, now Patent No. 2,780,055, issued February 5, 1957, to Carlton W. Bristol, Jr.

I claim:

1. A housing having a chamber for fuel and an inlet and outlet for the chamber, valve means for controlling the admission of fuel to said chamber through said inlet, means for permitting said chamber to be purged of air by said fuel so that said chamber may be filled with fuel, fuel pressure responsive means for moving said valve means to close said inlet and said purging means when said chamber is full of fuel, and piston means actuated by said moving of said valve means for displacing the fuel from said chamber through said outlet.

2. A housing having a chamber for fuel and an outlet for the chamber, valve means for controlling the admission of fuel to said chamber, means for permitting said chamber to be purged of air by said fuel, so that said chamber may be filled with fuel, fuel pressure responsive means for moving said valve means to close said inlet and said purging means when said chamber is full of fuel, and piston means actuated by said moving of said valve means for displacing the fuel from said chamber through said outlet, said valve means including passage means for directing fluid under pressure to said piston means when said valve is moved by said fuel pressure.

3. A housing having a chamber for fuel and an outlet for the chamber, valve means for controlling the admission of fuel to said chamber, fuel pressure responsive means for closing said valve means when said chamber is full of fuel, and piston means actuated by the closing of said valve means for displacing the fuel through said outlet, said valve means including passage means for directing fluid under pressure to said piston means and for connecting said outlet to said chamber when said valve is moved by said fuel pressure.

4. A housing having a chamber for fuel and an outlet for the chamber, valve means for controlling the admission of fuel to said chamber, means for permitting said chamber to be purged of air by said fuel so said chamber will become full of fuel, said last named means including a restrictive drain conduit connected to said chamber, means responsive to fuel pressure in said chamber for closing said valve, and piston means to displace fuel through said outlet, said valve means having means thereon for directing fluid under pressure to said piston means and means thereon for connecting said outlet to said chamber and disconnecting said drain conduit from said chamber when said valve is moved by said fuel pressure.

5. In combination, an engine having a compressor, means for supplying air to said engine, means for supplying fuel to said engine, means for igniting the fuel-air mixture in the engine formed by said first and second named means, an afterburner, means for supplying gas to said afterburner, said gas containing oxygen, means for supplying fuel to said afterburner, and means for igniting the fuel-gas mixture in the afterburner formed by said fourth and fifth named means, said last named means having two pistons for displacing additional fuel into said engine thereby enriching the fuel-air ratio in the engine, one piston being responsive to engine compressor pressure rise, the second piston being actuated by said first piston to displace additional fuel into said engine when the engine compressor pressure rise is placed across said first piston, and means for placing engine compressor pressure rise across said first piston.

6. A housing having a first bore, a cover closing the open end of said bore, a first piston in said bore, said piston having a first annular groove therearound, a recess in one end, a passage connecting said groove with said recess, a restriction in said passage, a second annular groove located between said first annular groove and the end of the piston with said recess, a third annular groove located between said first annular groove and the other end of said piston, and a passage connecting said groove with said other end of said piston, a spring between said other end of said piston and said cover, said housing having a second bore, said housing having a third bore larger than said second bore, said second and third bores being co-axially aligned, the end of the second bore extending into said third bore within a circular flange, a second piston in said third bore, said piston forming a chamber with said cover, said piston having a hole therethrough with a restriction, a third piston in said second bore extending through said flange into said third bore, a spring seat on the end of said third piston which extends into said third bore, a spring mounted between said spring seat and the bottom of the third bore for biasing said second and third piston towards said cover forming a chamber between the end of the third piston within the second bore and the end of the bore, said flanged spring seat having holes therein, a passage connecting said first bore with the chamber formed by the second piston and the cover, a conduit connecting said third bore with a working pressure, a conduit connecting said other end of the first piston with a working pressure, a conduit for connecting said first bore with a fuel supply, a conduit for connecting said first bore with an outlet nozzle, a conduit having a restriction connecting said first bore to drain, a passage connecting said first bore with said chamber, and a second passage connecting said chamber with said first bore.

7. In combination, an engine having a compressor, a main combustion chamber and a turbine, means for supplying air to said engine, means for supplying fuel to said engine, means for igniting the fuel-air mixture in the engine formed by said first and second named means, an afterburner, means for supplying gas to said afterburner, said gas containing oxygen, means for supplying fuel to said afterburner and means for igniting the fuel-gas mixture in the afterburner formed by said fourth and fifth named means, said last named means having a chamber for fuel, said main combustion chamber having a nozzle therein, a connection between said chamber and said nozzle, said last named means having valve means for controlling the admission of fuel to said chamber, fuel pressure responsive means for closing said valve means when said chamber is full of fuel, and piston means actuated by the closing of said valve means for displacing the fuel from said chamber through said nozzle.

8. In combination, an engine, said engine having a main combustion chamber, means for supplying air to said combustion chamber, means for supplying fuel to said combustion chamber, means for igniting the fuel-air mixture in the combustion chamber formed by said first and second named means, an afterburner, means for supplying gas to said afterburner, said gas containing oxygen, means for supplying fuel to said afterburner, and means for igniting the fuel-gas mixture in the afterburner formed by said fourth and fifth named means, said combustion chamber having a nozzle therein, said last named means having piston means including two pistons for displacing additional fuel into said combustion chamber through said nozzle thereby enriching the fuel-air ratio in the engine, one piston being large and the other piston being small, and second piston means responsive to the fuel supplied to said afterburner for controlling said large piston of the first piston means, said large piston moving said small piston to displace the additional fuel through said nozzle.

9. A gas turbine engine comprising main combustion equipment, a first fuel supply system connected to supply fuel under pressure to said main combustion equipment and including main fuel injectors in said main combustion equipment, a turbine system connected to receive heated working medium from the main combustion equipment, additional combustion equipment arranged downstream of the turbine system to receive working medium exhausting from the turbine system, a second fuel supply system connected to supply fuel under pressure to said additional combustion equipment, an additional fuel injector in said main combustion equipment, a container divided into a first space and a second space by a movable member, resilient means urging said movable member in the sense to increase the volume of said first space, a first hydraulic connection to one of said fuel supply systems whereby said connection receives fuel under pressure, a second hydraulic connection to said additional fuel injector and valve means operable to place said second space alternatively in communication with said first and said second hydraulic connections, whereby on operation of said valve means to place said second space in communication with said first hydraulic connection, a predetermined volume of fuel is fed into said second space, and, on subsequent operation of said valve means to place said second space in communication with said second hydraulic connection, said predetermined volume of fuel is introduced into the main combustion equipment additionally to the normal fuel supply to initiate combustion of the fuel supplied to the additional combustion equipment.

References Cited in the file of this patent

UNITED STATES PATENTS

| 1,482,467 | Harrington | Feb. 5, 1924 |
| 1,994,747 | Bishop et al. | Mar. 19, 1935 |
| 2,279,546 | Ziegler | Apr. 14, 1942 |
| 2,520,434 | Robson | Aug. 29, 1950 |
| 2,552,231 | Streid et al. | May 8, 1951 |
| 2,626,655 | Trautman et al. | Jan. 27, 1953 |
| 2,640,316 | Neal | June 2, 1953 |

FOREIGN PATENTS

| 211,134 | Switzerland | Nov. 1, 1940 |